US 6,733,054 B2

(12) United States Patent
Kim

(10) Patent No.: US 6,733,054 B2
(45) Date of Patent: May 11, 2004

(54) BUMPER BEAM REINFORCEMENT STRUCTURE

(75) Inventor: Sang Ha Kim, Kyungki-Do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/331,246

(22) Filed: Dec. 30, 2002

(65) Prior Publication Data

US 2004/0046404 A1 Mar. 11, 2004

(30) Foreign Application Priority Data

Sep. 10, 2002 (KR) .................................. 10-2002-61385

(51) Int. Cl.⁷ ............................................... B60R 19/02
(52) U.S. Cl. ...................... 293/102; 293/133; 293/155
(58) Field of Search ............................. 293/133, 120, 293/121, 132, 146, 147, 148, 149, 151, 152, 153, 155, 102; 296/187.01, 187.03, 187.09

(56) References Cited

U.S. PATENT DOCUMENTS

| 3,724,603 | A | * | 4/1973 | Shiomi et al. | |
| 4,711,481 | A | * | 12/1987 | Krage et al. | 293/133 |
| 4,715,630 | A | * | 12/1987 | Manning | 293/120 |
| 4,856,833 | A | * | 8/1989 | Beekman | 293/120 |
| 5,150,935 | A | * | 9/1992 | Glance et al. | 293/136 |
| 6,168,226 | B1 | * | 1/2001 | Wycech | 293/120 |
| 6,595,502 | B2 | * | 7/2003 | Koch et al. | 293/133 |
| 2002/0101086 | A1 | * | 8/2002 | Koch et al. | 293/133 |

FOREIGN PATENT DOCUMENTS

| DE | 4209826 | * | 9/1993 | 293/133 |
| DE | 4239460 | * | 5/1994 | 293/132 |
| EP | 40109 | * | 11/1981 | 293/11 |
| EP | 556667 | * | 8/1993 | 293/132 |
| JP | 58-206447 | * | 12/1983 | 293/132 |

* cited by examiner

Primary Examiner—D. Glenn Dayoan
Assistant Examiner—H Gutman
(74) Attorney, Agent, or Firm—Morgan Lewis & Bockius LLP

(57) ABSTRACT

A bumper beam reinforcement structure has plurality of pairs or plate insertion holes formed side by side in a longitudinal direction of a bumper beam. These insertion holes are formed on the upper surface and the lower surface of the bumper stay mounting part. Inverted U-shaped steel plates are inserted into the plurality of plate insertion holes. When an impact occurs, the deformation and the rotation of the bumper stay mounting part of the bumper beam is effectively prevented. In addition, parts such as a headlight, a corresponding panel and the like are preferably hardly damaged. Further, the cost for manufacturing the bumper beam reinforcement structure can be significantly reduced.

10 Claims, 5 Drawing Sheets

BUMPER BEAM REINFORCEMENT STRUCTURE

FIELD OF THE INVENTION

The present invention relates to a bumper beam reinforcement structure, and more particularly, to a bumper beam reinforcement structure wherein a plurality of pairs of plate inserting holes are formed on the upper surface and the lower surface of a bumper stay mounting part and a plurality of inverted U-shaped steel plates are inserted into the plurality of inserting holes, thereby reducing manufacturing cost and eliminating impact energy generated from a vehicle collision.

BACKGROUND OF THE INVENTION

Generally, bumpers are provided on front and rear ends of a car in order to protect passengers from an impact generated during a car collision. The bumper typically includes a bumper cover for exterior aesthetics of the car and an impact absorbing member, which is mounted on the inside of the bumper cover, for absorbing impact generated in a collision. The bumper also typically includes a bumper beam made of metal such as steel, aluminum, etc., in order to alleviate a given impact. The bumper beam is coupled to the body frame of the car by a bumper stay and entirely supports the remainder of the bumper structure.

Further, the bumper beam is typically reinforced with ribs, inner bulkheads or other reinforcement members in order to prevent the bumper beam from destruction from an intense impact from a car collision, etc.

In a car collision, a part of the impact energy is absorbed by the impact absorbing member, and the remaining impact energy is transferred to the bumper beam. The impact energy, which is transferred to the bumper beam, is gradually absorbed as it passes through the bumper stay. Finally, the remaining impact energy is absorbed by the body frame which is connected to the bumper stay. Such a bumper structure can protect passengers from an impact of a car collision, etc.

In order to effectively reduce the impact energy generated from a high speed car collision, the absorbing member should be formed densely with lots of impact cells. However, this results in increased manufacturing costs. Accordingly, an absorbing member that better absorbs impact and that can be produced for a lower cost, would be highly desirable.

SUMMARY OF THE INVENTION

A bumper beam reinforcement structure is provided in which a plurality of pairs of plate insertion holes are formed, side by side, in the longitudinal direction of a bumper stay mounting part. Inverted U-shaped steel plates are inserted in each pair of plate insertion holes, thereby decreasing the manufacturing costs and reducing impact energy. The steel plates preferably have through-holes on the lower end thereof, which are tightly fixed to the plate insertion holes by a bolt which entirely passes through the through-holes and by a nut which is coupled to the bolt, thereby securing all of the steel plates together.

In an alternative embodiment of the invention, a bumper beam reinforcement structure includes a bumper beam and at least one plate. The bumper beam has at least one pair of opposing plate insertion holes formed through opposing upper and lower surfaces of the bumper beam. A plate, preferably made from a metal, such as steel, extends through the at least one pair of plate insertion holes, such that in use the plate absorbs impact directed at the bumper beam.

In a preferred embodiment, the bumper beam reinforcement structure includes multiple pairs of plate insertion holes, each having a separate plate extending therethrough. The multiple pairs of plate insertion holes are aligned substantially parallel with one another along a longitudinal direction of the bumper beam. Each plate preferably includes two vertical surfaces that are substantially parallel to each other, and a horizontal surface joining the two vertical surfaces to one another to form a U-shaped plate. Each plate preferably has a different width between the two vertical surfaces. In a preferred embodiment, each plate having a smaller width is positioned within each plate having a larger width. Each plate preferably extends through two pairs of opposing plate insertion holes. Also, each vertical surface includes at least one hole therethrough wherein the hole is formed through each vertical surface at a position remote from the horizontal surface. A bolt extends through each hole formed through each vertical surface, and a nut coupled to the bolt secures the plate to the bumper beam.

BRIEF DESCRIPTION OF THE DRAWINGS

Characteristics and advantages of the present invention will become more apparent by describing in detail preferred embodiments thereof with reference to the attached drawings, in which.

DETAILED DESCRIPTION OF THE INVENTION

Figure 1:
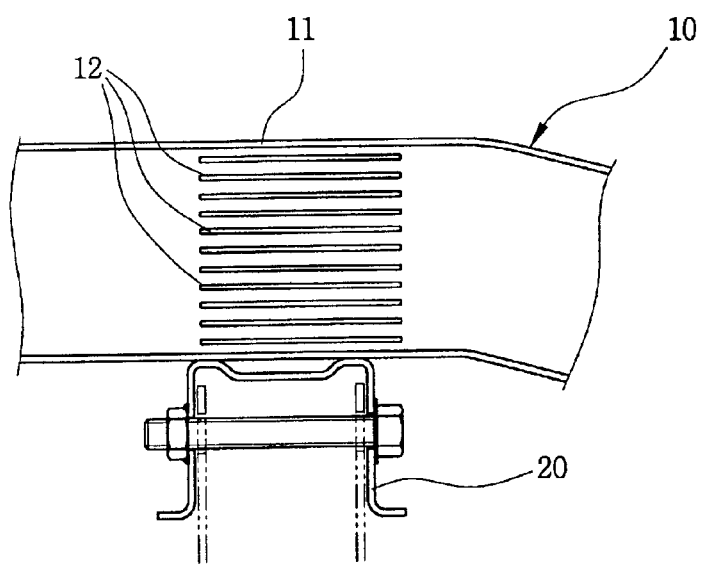
FIG. 1 is a plan view of a bumper beam reinforcement structure, where a plurality of steel plate insertion holes are formed, according to the preferred embodiment of the present invention.

Hereinafter, the bumper beam reinforcement structure according to the preferred embodiment of the present invention will be explained in more detail with reference to the accompanying drawings. FIG. 1 is a plan view of a bumper beam 10 adjacent a bumper stay 20 provided in a bumper beam reinforcement structure according to the preferred embodiment of the present invention. As shown, a plurality of plate insertion holes 12 are formed, side by side, in a longitudinal direction of the bumper beam 10, on the upper surface and the lower surface of a bumper stay mounting part 11. In a preferred embodiment, the plurality of plate inserting holes 12 are formed, in an even number, on the upper surface and the lower surface of the bumper stay mounting part 11. Each plate insertion hole 12 is peferably arranged at a constant interval or space next to a neighboring insertion hole 12. Further, the plurality of insertion holes 12 are preferably formed on the right side and the left side of two bumper stay mounting part 11, as explained above.

Figure 2:
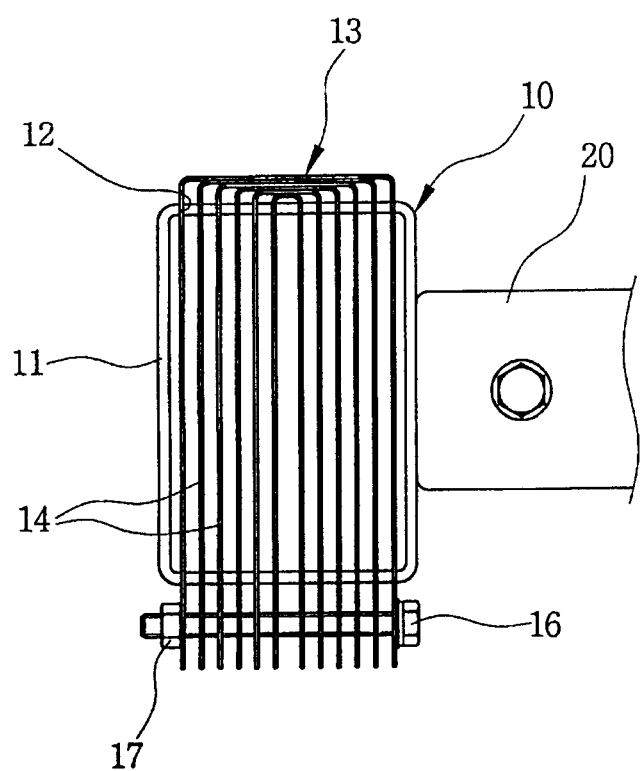
FIG. 2 is a cross sectional view of the bumper beam reinforcement structure of FIG. 1, where the steel plates are inserted.
Figure 3:
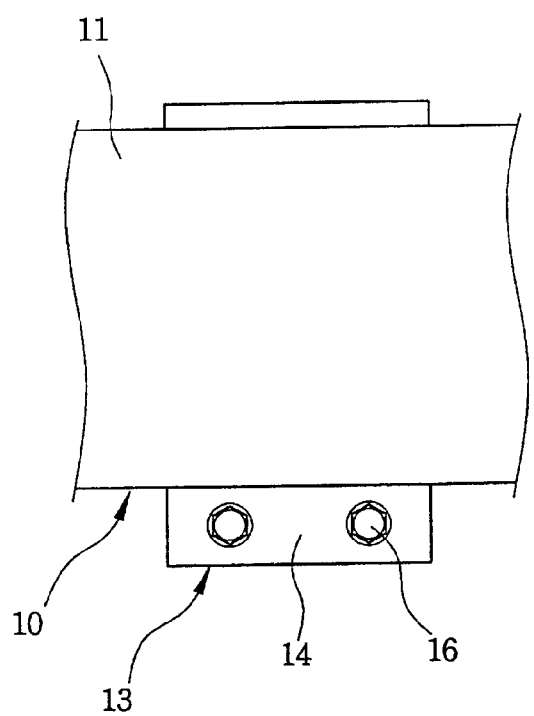
FIG. 3 is a front elevational view of a bumper stay mounting part, where the steel plates are inserted, according to preferred embodiment of the present invention.

FIG. 2 is a cross-sectional view of the bumper beam where the steel plate assembly according to a preferred embodiment of the present invention is inserted. FIG. 3 is a front elevational view of the bumper beam where the steel plate assembly, according to a preferred embodiment of the present invention, is inserted. As shown in FIGS. 2 and 3, the inverted U-shaped steel plate 14 having the smallest width between vertical plates is firstly inserted in the corresponding middle two inserting holes 12. Afterward, another steel plate 14 having a relatively greater width between vertical surfaces than that of the already inserted steel plate 14 is inserted into the two inserting holes 12 adjacent to the middle inserting holes 12, thereby covering the steel plate inserted before it. In this way, the steel plate 14 having relatively greater width between vertical surfaces is inserted to cover the steel plate 14 having relatively smaller width. Therefore, all steel plates 14 are formed in many folds, thereby forming one steel plate assembly 13. Similarly, a steel plate assembly 13 is provided on the right side and the left sides of the bumper beam 10.

As explained above, the corresponding steel plates 14 inserted in each steel plate inserting holes 12 are coupled to one other by a bolt 16 which passes through a through hole formed on the lower end of each steel plate 14 and by a nut 17 which is thread onto the bolt 16. Once the nut is tightened all the steel plates 14 comprising the steel plate assembly 13 become surely attached to the plate inserting holes 12.

Figure 4:
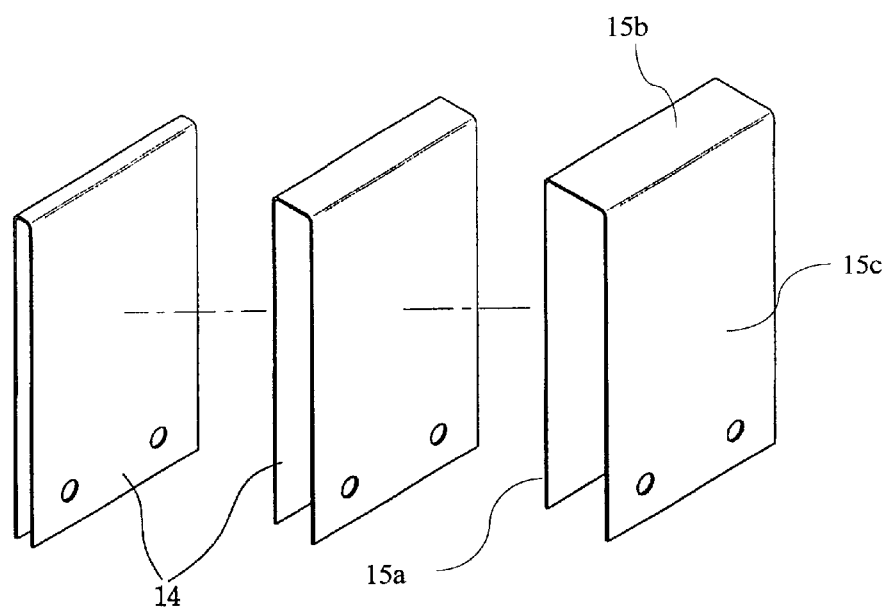
FIG. 4 is a perspective view showing the steel plates according to the preferred embodiment of the present invention.

As shown in FIG. 4, each steel plate 14 is preferably formed by bending a rectangular steel plate having a predetermined thickness into an inverted U-shape. That is, each steel plate 14 is formed to have two rectangular vertical surfaces 15a, 15c and one rectangular horizontal surface 15b coupling the two vertical surfaces to one another at one end. Also, each steel plate 14 is formed to have a different width between vertical surfaces in order to cover prior steel plate 14 having relatively narrower widths. That is, the gap between two vertical surfaces 15a, 15c differs from that of each steel plate 14.

Figure 5:
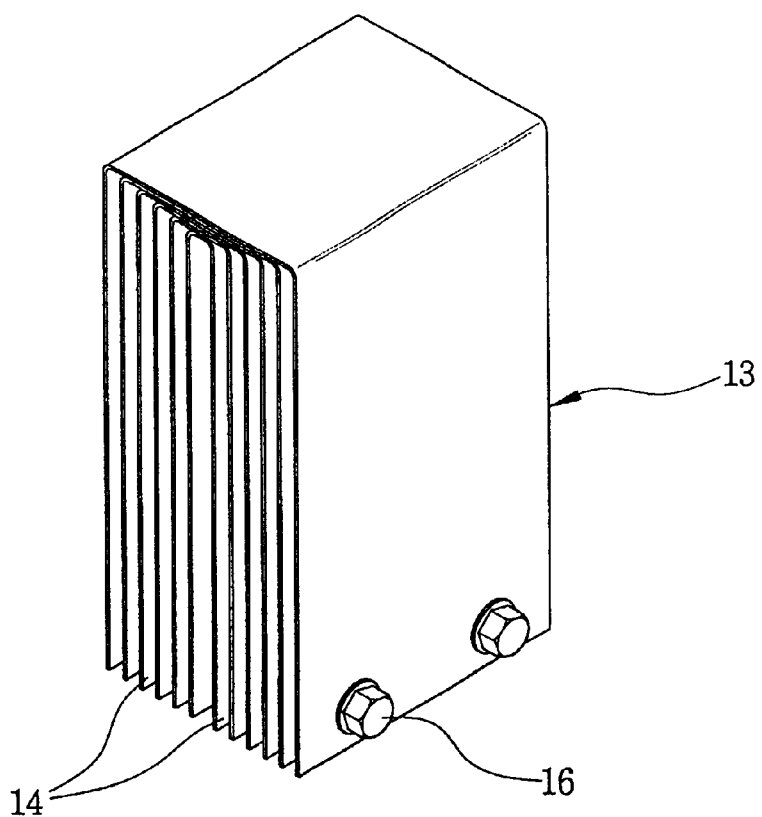
FIG. 5 is a perspective view showing the assembly of the steel plates of FIG. 4.

FIG. 5 is a perspective view of the steel plate assembly according to the preferred embodiment of the present invention, in which the bumper beam is omitted. As shown, the steel plate 14 having a relatively smaller gap between two vertical surfaces 15a, 15c is arranged between within the two vertical surfaces 15a, 15c of the steel plate 14 having a relatively greater gap. Accordingly, the plurality of steel plates 14 are provided to overlap with each other. The steel plate having the greatest gap between the two vertical surfaces is arranged in the outermost position, and the steel plate having the smallest gap between the two vertical surfaces is arranged in the innermost position. And the steel plates 14 are coupled to one another by the bolt 16 which passes entirely through the through holes formed on the lower ends of the steel plates 14, and by the nut 17 which is combined to the bolt 16, thereby forming a single steel plate assembly 13.

In manufacturing the above described bumper beam reinforcement, it is preferable that the steel plate has a thickness of between about 1 to 2 mm. Additionally, the number of the inserted steel plates varies depending on the depth or width of the bumper beam. Also, the number of bolts and nuts combining each steel plate assembly 13 may vary.

According to the bumper beam reinforcement structure of the present invention, in a car collision of over 10 mph speed, the bumper beam cannot avoid being deformed. Further, the deformation and the rotation of the bumper stay can be effectively prevented. Further, parts such as a headlight, a corresponding panel, or the like, will hardly be damaged, because the steel plate assembly can absorb nearly all of the impact energy generated by the collision. Still further, the bumper beam reinforcement structure can be manufactured at a lower cost than that of current absorbers.

While the present invention has been particularly shown and described with reference to a particular embodiment thereof, it will be understood by those skilled in the art that various changes in forms and details may be effected therein without departing from the spirit and scope of the invention as defined by the appended claims.

What is claimed is:

1. A bumper beam reinforcement structure comprising:
   a bumper stay mounting part in which a plurality of couple plate insertion holes are formed side by side on an upper surface and a lower surface thereof in a longitudinal direction of a bumper beam; and
   a plurality of inverted U shaped steel plates which are inserted into said insertion holes.

2. The bumper beam reinforcement structure according to claim 1, wherein said steel plates have through-holes on a lower end thereof, and said steel plates are tightly fixed to said plate inserting holes by a bolt which passes through said through-holes as well as by a nut, wherein said bolt is inserted, thereby securing all of said steel plates as an integrated body.

3. A bumper beam reinforcement structure, comprising:
   a bumper beam having multiple pairs of opposing plate insertion holes formed through opposing upper and lower surfaces of said bumper beam; and
   separate plates extending through each said pair of plate insertion holes, such that in use said plates absorb impact directed at said bumper beam, wherein each said plate comprises:
   two vertical surfaces that are substantially parallel to each other; and
   a horizontal surface joining said two vertical surfaces to one another to form a U-shaped plate.

4. The bumper beam reinforcement structure of claim 3, wherein each said plate has a different width between said two vertical surfaces.

5. The bumper beam reinforcement structure of claim 4, wherein a plate having a smaller width is positioned within a plate having a larger width.

6. The bumper beam reinforcement structure of claim 3, wherein each said plate extends through two pairs of said opposing plate insertion holes.

7. The bumper beam reinforcement structure of claim 3, wherein each said vertical surface includes at least one hole therethrough.

8. The bumper beam reinforcement structure of claim 7, wherein said at least one hole is formed through each vertical surface at a position remote from said horizontal surface.

9. The bumper beam reinforcement structure of claim 8, further comprising a bolt extending through each said hole formed through each said vertical surface, and a nut coupled to said bolt to secure said plate to said bumper beam.

10. The bumper beam reinforcement structure of claim 3, wherein said plate is a steel plate.

* * * * *